(12) United States Patent
Kobayashi

(10) Patent No.: US 11,698,061 B2
(45) Date of Patent: Jul. 11, 2023

(54) VIBRATION BODY UNIT AND VIBRATION BODY SUPPORT STRUCTURE

(71) Applicant: HONDA MOTOR CO., LTD., Tokyo (JP)

(72) Inventor: Tsuyoshi Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1107 days.

(21) Appl. No.: 16/398,324

(22) Filed: Apr. 30, 2019

(65) Prior Publication Data

US 2019/0353153 A1 Nov. 21, 2019

(30) Foreign Application Priority Data

May 17, 2018 (JP) ................................ 2018-095197

(51) Int. Cl.
*F04B 39/00* (2006.01)
*F16F 1/38* (2006.01)
(Continued)

(52) U.S. Cl.
CPC ............ *F04B 39/0044* (2013.01); *F01P 5/12* (2013.01); *F16F 7/12* (2013.01); *H02K 5/24* (2013.01);
(Continued)

(58) Field of Classification Search
CPC .... F16F 7/12; F16F 1/38; F16F 1/3821; F16F 1/3828; F16F 1/3835; F16F 15/00;
(Continued)

(56) References Cited

U.S. PATENT DOCUMENTS 1,688,891 A * 10/1928 Spreen ................... H02K 1/185
  310/410
1,832,368 A * 11/1931 Ell ........................... A47L 9/22
  248/603
(Continued)

FOREIGN PATENT DOCUMENTS

CN 104442353 3/2015
CN 107869614 A * 4/2018
(Continued)

OTHER PUBLICATIONS

Japanese Office Action for Japanese Patent Application No. 2018-095197 dated Mar. 27, 2020.
(Continued)

*Primary Examiner* — Edgardo San Martin
(74) *Attorney, Agent, or Firm* — Amin, Turocy & Watson, LLP

(57) ABSTRACT

A vibration body unit includes: a vibration body; an inner cylinder that surrounds a circumference of the vibration body and that is elastically deformable; an outer cylinder that surrounds a circumference of the inner cylinder and that has an attachment section which is attached to a base part; a plurality of first spacers that are interposed between the vibration body and the inner cylinder and that are arranged to be spaced in a circumferential direction; and a plurality of second spacers that are interposed between the inner cylinder and the outer cylinder and that are arranged to be spaced in a circumferential direction, wherein the plurality of first spacers and the plurality of second spacers are arranged such that at least part of each of the plurality of first spacers faces each of the plurality of second spacers in a radial direction across the inner cylinder.

9 Claims, 4 Drawing Sheets

(51) Int. Cl.
*F16F 15/02* (2006.01)
*F16F 15/04* (2006.01)
*H02K 5/24* (2006.01)
*F04D 29/66* (2006.01)
*F01P 5/12* (2006.01)
*F16F 7/12* (2006.01)

(52) U.S. Cl.
CPC ..... *F16F 2230/105* (2013.01); *F16F 2234/02* (2013.01)

(58) Field of Classification Search
CPC .. F16F 15/02; F16F 15/04; F16F 15/08; F16F 2230/105; F16F 2234/02; F04B 39/0044; F04B 39/0027; H02K 5/24; F04D 29/66; F04D 29/668
See application file for complete search history.

(56) References Cited

U.S. PATENT DOCUMENTS

| | | | | |
|---|---|---|---|---|
| 1,866,154 A * | 7/1932 | Ell | ............ | A47L 9/22 417/423.2 |
| 2,108,734 A * | 2/1938 | Van Sciver | ........... | F23D 11/001 417/363 |
| 2,632,861 A * | 3/1953 | Morton | ............ | H02K 1/185 310/431 |
| 3,143,284 A * | 8/1964 | Lindsjo | ............ | F04D 29/646 310/91 |
| 3,394,908 A * | 7/1968 | Irvin | ............ | H02K 5/24 248/605 |
| 4,134,036 A * | 1/1979 | Curtiss | ............ | H02K 1/185 310/91 |
| 4,306,844 A | 12/1981 | Otto et al. | | |
| 4,676,473 A * | 6/1987 | Giles | ............ | F25D 23/006 248/680 |
| 5,002,467 A * | 3/1991 | Talaski | ............ | F02B 77/13 417/423.15 |
| 5,315,200 A * | 5/1994 | Lemieux | ............ | H02K 1/185 310/407 |
| 5,397,950 A * | 3/1995 | Norbury, Jr. | ........... | H02K 1/187 310/58 |
| 5,873,710 A * | 2/1999 | Tucker | ............ | H02K 1/185 417/410.5 |
| 5,875,816 A * | 3/1999 | Frank | ............ | F02M 37/44 137/574 |
| 6,930,416 B1* | 8/2005 | Remington | ............ | H02K 1/185 310/59 |
| 11,248,603 B2* | 2/2022 | Rutter | ............ | F04C 15/0061 |
| 2004/0032177 A1* | 2/2004 | Nitzsche | ............ | H02K 5/24 310/91 |
| 2019/0190345 A1* | 6/2019 | Childs | ............ | B32B 9/007 |

FOREIGN PATENT DOCUMENTS

| | | | |
|---|---|---|---|
| DE | 10019572 | 10/2001 | |
| EP | 0203244 | 12/1986 | |
| EP | 0558110 A1 * | 9/1993 | ............ F04D 29/62 |
| EP | 0701058 | 3/1996 | |
| EP | 1320172 | 6/2003 | |
| EP | 2088328 | 8/2009 | |
| JP | 56-086400 | 7/1981 | |
| JP | 59-094630 | 5/1984 | |
| JP | 59-094630 | 6/1984 | |
| JP | H0627458 Y2 * | 7/1994 | |
| JP | 2003-004099 | 1/2003 | |
| JP | 2011-027203 | 2/2011 | |
| JP | 2014-522928 | 9/2014 | |

OTHER PUBLICATIONS

Japanese Notice of Allowance for Japanese Patent Application No. 2018-095197 dated Oct. 13, 2020.
Chinese Office Action for Chinese Patent Application No. 201910374845.X dated Apr. 6, 2021.
Chinese Office Action for Chinese Patent Application No. 201910374845.X dated Aug. 24, 2020.

* cited by examiner

VIBRATION BODY UNIT AND VIBRATION BODY SUPPORT STRUCTURE

CROSS-REFERENCE TO RELATED APPLICATION

Priority is claimed on Japanese Patent Application No. 2018-095197, filed on May 17, 2018, the contents of which are incorporated herein by reference.

BACKGROUND

Field of the Invention

The present invention relates to a vibration body unit and a vibration body support structure.

Background

As a component that is mounted on a vehicle, there is such a component (vibration body) that is accompanied by vibration at the time of operation. As a vibration body, for example, there is an electrically driven water pump (hereinafter, referred to as a EWP) that circulates cooling water between a radiator and a cooling target (for example, an engine, an inverter, and the like). In the EWP, vibration is generated when a motor that is mounted on the EWP is rotated and by the pulsation of cooling water that passes through the EWP or the like. When the vibration that is generated at the EWP is transmitted to a vehicle body through a bracket or the like, there is a possibility that an occupant may feel the vibration as an abnormal sound, and the durability of an attachment part between the vehicle body and the bracket may be degraded.

Therefore, for example, Japanese Unexamined Patent Application, First Publication No. 2003-4099 discloses a configuration which includes a fixation member that surrounds the circumference of a vibration body and a plurality of elastic protrusion parts that are intermittently provided in a circumferential direction between the vibration body and the fixation member.

According to this configuration, vibration that is generated by the vibration body is absorbed by the elastic protrusion part, and thereby, it is possible to prevent the occurrence of noise.

SUMMARY

However, in the related art described above, there is room for improvement in supporting the vibration body stably while further improving a vibration absorption performance.

An aspect of the present invention provides a vibration body unit and a vibration body support structure capable of stably supporting a vibration body while further improving a vibration absorption performance.

(1) A vibration body unit according to an aspect of the present invention includes: a vibration body; an inner cylinder that surrounds a circumference of the vibration body and that is elastically deformable; an outer cylinder that surrounds a circumference of the inner cylinder and that has an attachment section which is attached to a base part; a plurality of first spacers that are interposed between the vibration body and the inner cylinder and that are arranged to be spaced in a circumferential direction; and a plurality of second spacers that are interposed between the inner cylinder and the outer cylinder and that are arranged to be spaced in a circumferential direction, wherein the plurality of first spacers and the plurality of second spacers are arranged such that at least part of each of the plurality of first spacers faces each of the plurality of second spacers in a radial direction across the inner cylinder.

(2) In the vibration body unit according to the above aspect (1), the first spacer may be formed integrally with at least one of the vibration body and the inner cylinder, and the second spacer may be formed integrally with at least one of the inner cylinder and the outer cylinder.

(3) In the vibration body unit according to the above aspect (1) or (2), the first spacer may be formed integrally with the vibration body.

(4) In the vibration body unit according to any one of the above aspects (1) to (3), the first spacer may be formed integrally with the inner cylinder.

(5) In the vibration body unit according to any one of the above aspects (1) to (4), the second spacer may be formed integrally with the inner cylinder.

(6) In the vibration body unit according to any one of the above aspects (1) to (5), the second spacer may be formed integrally with the outer cylinder.

(7) In the vibration body unit according to any one of the above aspects (1) to (6), a first regulation part that regulates a movement in a circumferential direction of the first spacer with respect to one or more of the vibration body and the inner cylinder may be formed on the one or more of the vibration body and the inner cylinder.

(8) In the vibration body unit according to any one of the above aspects (1) to (7), a second regulation part that regulates a movement in a circumferential direction of the second spacer with respect to one or more of the inner cylinder and the outer cylinder may be formed on the one or more of the inner cylinder and the outer cylinder.

(9) In the vibration body unit according to any one of the above aspects (1) to (8), the outer cylinder may include: a first support part that has the attachment section; and a second support part that is connected to the first support part and that surrounds a circumference of the inner cylinder together with the first support part.

(10) A vibration body support structure according to another aspect of the present invention includes: an inner cylinder that surrounds a circumference of a vibration body and that is elastically deformable; an outer cylinder that surrounds a circumference of the inner cylinder and that has an attachment section which is attached to a base part; a plurality of first spacers that are interposed between the vibration body and the inner cylinder and that are arranged to be spaced in a circumferential direction; and a second spacer which is interposed between the inner cylinder and the outer cylinder at a position where at least part of the second spacer faces the first spacer in a radial direction across the inner cylinder.

According to the above aspects (1) and (10), the vibration body is supported by the inner cylinder via the first spacer, and the inner cylinder is supported by the outer cylinder via the second spacer. That is, the vibration body and the inner cylinder are partially in contact with each other, and the inner cylinder and the outer cylinder are partially in contact with each other. Therefore, it is possible to reduce a contact area compared to a case where an outer circumferential surface of the vibration body and an inner circumferential surface of the inner cylinder are directly in contact with each other, and an outer circumferential surface of the inner cylinder and an inner circumferential surface of the outer cylinder are directly in contact with each other. Thereby, it is possible to prevent vibration that is generated at the vibration body from being transmitted to the outer cylinder.

Accordingly, it is possible to prevent the vibration from being transmitted via the outer cylinder to the inside of a vehicle room and the like, and it is possible to improve the durability at an attachment part between the outer cylinder and the base part of a vehicle body.

Specifically, according to the aspects (1) and (10), the first spacer and the second spacer face each other in the radial direction across the inner cylinder. Therefore, a load (pressing load) of the vibration body that acts on the inner cylinder and the outer cylinder via the first spacer acts via the first spacer and the second spacer that are arranged on the same straight line. Thereby, it is possible to stably support the vibration body, for example, compared to a case where the first spacer and the second spacer are arranged to be displaced from each other in a circumferential direction.

Further, by only monitoring a tolerance of the first spacer and the second spacer, it is possible to monitor the load that acts on the inner cylinder and the outer cylinder. Therefore, manufacturing management becomes easy compared to a case where the outer circumferential surface of the vibration body and the inner circumferential surface of the inner cylinder are directly in contact with each other, and the outer circumferential surface of the inner cylinder and the inner circumferential surface of the outer cylinder are directly in contact with each other. Accordingly, it is possible to reduce costs.

According to the above aspect (2), it is possible to reduce the number of components and improve an assembly property compared to a case where a spacer as a separate body is interposed between the vibration body and the inner cylinder, and a spacer as a separate body is interposed between the inner cylinder and the outer cylinder.

According to the above aspect (3), the first spacer is formed integrally with the vibration body, and therefore, it is possible to simplify the inner cylinder and the outer cylinder.

According to the above aspect (4), the first spacer is formed integrally with the inner cylinder, and therefore, when adjusting (tuning) a protrusion amount of the second spacer, there is little impact from a surrounding member, for example, compared to a case where the first spacer is formed on the vibration body. Thereby, it is possible to further simplify the manufacturing management, and it is possible to reduce costs.

According to the above aspect (5), the second spacer is formed integrally with the inner cylinder, and therefore, when adjusting (tuning) a protrusion amount of the second spacer, there is little impact from a surrounding member, for example, compared to a case where the second spacer is formed on the outer cylinder. Thereby, it is possible to further simplify the manufacturing management, and it is possible to reduce costs.

According to the above aspect (6), the second spacer is formed integrally with the outer cylinder, and therefore, it is possible to simplify the inner cylinder and the vibration body.

According to the above aspect (7), it is possible to regulate the relative movement in the circumferential direction between the first spacer and the one or more of the vibration body and the inner cylinder and prevent the position displacement between the first spacer and the second spacer. As a result, it is possible to stably support the vibration body for a long period of time.

Further, in a state where the positions of the first spacer and the first regulation part are adjusted, the first spacer and the one or more of the vibration body and the inner cylinder are assembled, and thereby, it is possible to arrange the first spacer at a desired position. Therefore, it is possible to improve the assembly property between the vibration body and the inner cylinder.

According to the above aspect (8), it is possible to regulate the relative movement in the circumferential direction between the second spacer and the one or more of the inner cylinder and the outer cylinder and prevent the position displacement between the first spacer and the second spacer. As a result, it is possible to stably support the vibration body for a long period of time.

Further, in a state where the positions of the second spacer and the second regulation part are adjusted, the second spacer and the one or more of the inner cylinder and the outer cylinder are assembled, and thereby, it is possible to arrange the second spacer at a desired position. Therefore, it is possible to improve the assembly property between the outer cylinder and the inner cylinder.

According to the above aspect (9), the outer cylinder has a divided configuration of the first support part and the second support part. Thereby, for example, in a case where the same vibration body is mounted on different types of vehicles or the like, the first support part having the attachment section is appropriately changed depending on the type of vehicle, and it is possible to use the second support part regardless of the type of vehicle. Thereby, it is possible to commonalize the second support part among types of vehicles, and therefore, it is possible to reduce costs.

DESCRIPTION OF THE EMBODIMENTS

Hereinafter, an embodiment of the present invention is described with reference to the drawings. A common configuration in embodiments described below may be given by the same reference sign, and a redundant description may be omitted.

Figure 1:
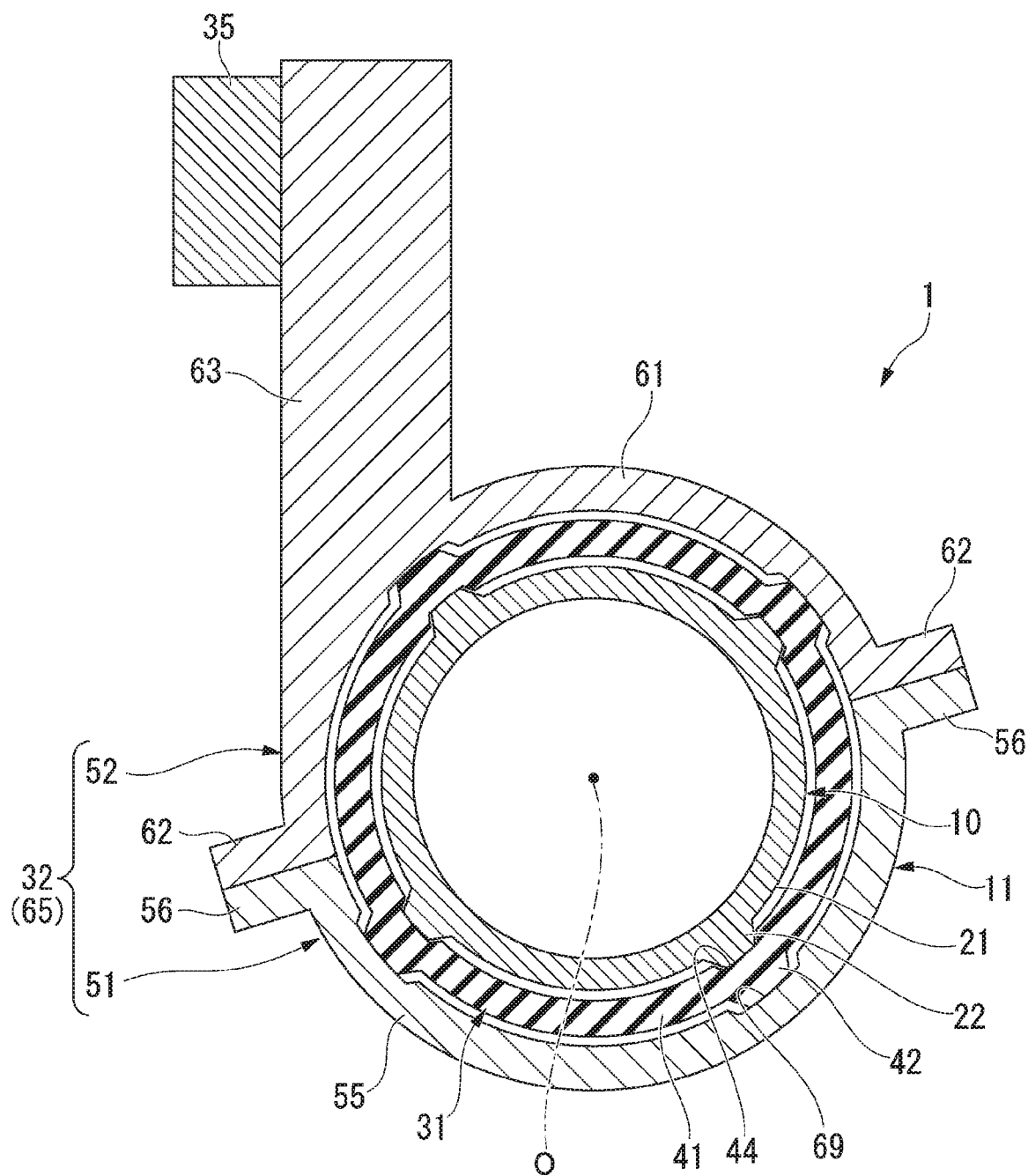
FIG. 1 is a schematic cross-sectional view of a pump unit according to an embodiment.

FIG. 1 is a schematic cross-sectional view of a pump unit 1.

A pump unit (vibration body unit) 1 shown in FIG. 1 is mounted, for example, in an engine room of a vehicle. Specifically, the pump unit 1 of the present embodiment includes a EWP (vibration body) 10 and a vibration body support structure 11 that attaches the EWP 10 to a vehicle body.

<EWP>

The EWP 10 is provided on a cooling circuit that connects a radiator and a cooling target (for example, an engine, an inverter, and the like). The EWP 10 compresses and sends cooling water that flows through the cooling circuit. The EWP 10 includes a housing 21 having a cylindrical shape. In the following description, a direction along an axis line O of the housing 21 is simply referred to as an axial direction, a direction orthogonal to the axial direction is referred to as a radial direction, and a direction around the axis line O is referred to as a circumferential direction.

For example, a drive room and a pump room are formed on the housing 21.

A motor, a circuit board, and the like are stored in the drive room. The motor includes a stator that is fixed to the inside of the drive room and a rotor rotatable at the inner side of the stator. A first protrusion part 22 (first spacer) that protrudes outward in the radial direction is formed on the housing 21. A plurality of (for example, four) first protrusion parts 22 are formed to be spaced in the circumferential direction.

An impeller is stored in the pump room. The impeller is rotated in the pump room in accordance with the rotation of the rotor. An inflow port through which the cooling water flows into the pump room and a discharge port through which the cooling water is sent under pressure from the pump room are formed on the pump room.

<Vibration Body Support Structure>

The vibration body support structure 11 includes an elastic member 31 and a bracket 32. The vibration body support structure 11 is supported by a base part 35 of the vehicle body via the bracket 32 and supports the EWP 10 via the elastic member 31.

The elastic member 31 includes an elastic cylinder (inner cylinder) 41 and a second protrusion part (second spacer) 42.

The elastic cylinder 41 is formed of an elastically deformable material such as a rubber. The elastic cylinder 41 surrounds the circumference of the housing 21 in a state of being spaced in the radial direction with respect to the outer circumferential surface of the housing 21. A first regulation part 44 that is recessed outward in the radial direction is formed on the inner circumferential surface of the elastic cylinder 41 at the same position in the circumferential direction as the position of the first protrusion part 22 described above. Each of the first protrusion parts 22 is separately accommodated in the first regulation part 44.

A width in the circumferential direction of the first regulation part 44 is formed to be equal to or more than a width of the first protrusion part 22. A depth in the radial direction of the first regulation part 44 is shallower than a height in the radial direction of the first protrusion part 22. Accordingly, the elastic member 31 is in contact with the EWP 10 (first protrusion part 22) only at an inner surface of the first regulation part 44 and is separated in the radial direction with respect to the EWP 10 at parts other than the first regulation part 44. The width, the depth, and the like of the first regulation part 44 can be appropriately changed in accordance with the shape of the first protrusion part 22.

The second protrusion part 42 is formed integrally with the elastic cylinder 41. The second protrusion part 42 is provided to protrude outward in the radial direction from an outer circumferential surface of the elastic cylinder 41 at the same position in the circumferential direction as the position of the first regulation part 44.

In the present embodiment, a width in the circumferential direction of the second protrusion part 42 is equal to or more than a width of the first regulation part 44. Accordingly, the entirety in the circumferential direction of the second protrusion part 42 faces the first regulation part 44 and the first protrusion part 22 in the radial direction across the elastic cylinder 41. That is, in the present embodiment, the first protrusion part 22 and the second protrusion part 42 that face each other in the radial direction are arranged in a radial fashion having the axis line O as a center. In this regard, it is sufficient that at least part of the second protrusion part 42 faces the first regulation part 44 and the first protrusion part 22.

The bracket 32 is formed in a cylindrical shape that surrounds the circumference of the elastic member 31. In the present embodiment, the bracket 32 has two parts that are divided in the circumferential direction. One of the two parts that are divided in the circumferential direction is a first support part 51. Another of the two parts that are divided in the circumferential direction is a second support part 52.

The first support part 51 includes a first arc section 55 and a first attachment piece 56.

The first arc section 55 is formed in an arc shape having the axis line O as a center. The first arc section 55 is arranged in a state of being spaced in the radial direction with respect to an outer circumferential surface of the elastic cylinder 41.

Each of the first attachment pieces 56 is provided to protrude outward in the radial direction from each of both end portions in the circumferential direction of the first arc section 55.

The second support part 52 includes a second arc section 61, a second attachment piece 62, and a stay (attachment section) 63.

The second arc section 61 is formed in an arc shape having a curvature radius similar to that of the first arc section 55 and having the axis line O as a center. The second arc section 61 is arranged in a state of being spaced in the radial direction with respect to an outer circumferential surface of the elastic cylinder 41.

Each of the second attachment pieces 62 is provided to protrude outward in the radial direction from each of both end portions in the circumferential direction of the second arc section 61.

The stay 63 is provided to protrude from a middle portion in the circumferential direction of the second arc section 61. The stay 63 is fixed to the base part 35 described above.

In the bracket 32 described above, the first attachment piece 56 and the second attachment piece 62 are fastened together in a state where the first attachment piece 56 and the second attachment piece 62 are overlapped with each other. Thereby, the first arc section 55 and the second arc section 61 constitute a support cylinder (outer cylinder) 65 that surrounds the circumference of the elastic member 31. The present embodiment is described using an example in which center angles of the arc sections 55, 61 having the axis line O as a center are 180°; however, the embodiment is not limited only to this configuration. The center angles of the arc sections 55, 61 can be appropriately changed as long as the center angles are set to be 360° in total. Further, the support cylinder 65 may be integrally formed in a cylindrical shape.

A second regulation part 69 that is recessed outward in the radial direction is formed on the inner circumferential surface of the support cylinder 65 at the same position in the circumferential direction as the position of the second protrusion part 42 described above. Each of the second protrusion parts 42 is separately accommodated in the second regulation part 69. A width in the circumferential direction of the second regulation part 69 is formed to be equal to or more than a width of the second protrusion part 42. A depth in the radial direction of the second regulation part 69 is shallower than a height in the radial direction of the second protrusion part 42. Accordingly, the support cylinder 65 is in contact with the elastic member 31 only at an inner surface of the second regulation part 69 and is separated in the radial direction with respect to the elastic member 31 (elastic cylinder 41) at parts other than the second regulation part 69.

The width, the depth, and the like of the second regulation part 69 can be appropriately changed in accordance with the shape of the first protrusion part 22.

In the pump unit 1 of the present embodiment, vibration that is accompanied by an operation of the EWP 10 is transmitted to the elastic member 31 via the first protrusion part 22 and is thereby attenuated at the elastic member 31.

In the pump unit 1 of the present embodiment, the EWP 10 is supported by the elastic member 31 via the first protrusion part 22, and the elastic member 31 is supported by the bracket 32 via the second protrusion part 42. That is, the housing 21 and the elastic member 31 are partially in contact with each other, and the elastic member 31 and the bracket 32 are partially in contact with each other. Therefore, it is possible to reduce a contact area compared to a case where an outer circumferential surface of the housing 21 and an inner circumferential surface of the elastic member 31 are directly in contact with each other, and an outer circumferential surface of the elastic member 31 and an inner circumferential surface of the bracket 32 are directly in contact with each other. Thereby, it is possible to prevent vibration that is generated at the EWP 10 from being transmitted to the bracket 32. Accordingly, it is possible to prevent the vibration from being transmitted via the bracket 32 to the inside of a vehicle room, and it is possible to improve the durability at an attachment part between the stay 63 and the base part 35.

Specifically, in the present embodiment, the first protrusion part 22 and the second protrusion part 42 face each other in the radial direction across the elastic cylinder 41.

According to this configuration, a load (pressing load) of the EWP 10 that acts on the elastic member 31 and the bracket 32 via the first protrusion part 22 intensively acts via the first protrusion part 22 and the second protrusion part 42 that are arranged on the same straight line. Thereby, it is possible to stably support the EWP 10, for example, compared to a case where the first protrusion part 22 and the second protrusion part 42 are arranged to be displaced from each other in a circumferential direction.

Accordingly, in the pump unit 1 of the present embodiment, it is possible to stably support the EWP 10 while further improving a vibration absorption performance.

Further, in the present embodiment, by only monitoring a tolerance of the first protrusion part 22 and the second protrusion part 42, it is possible to monitor the load that acts on the elastic member 31 and the bracket 32. Therefore, manufacturing management becomes easy compared to a case where the outer circumferential surface of the housing 21 and the inner circumferential surface of the elastic member 31 are directly in contact with each other, and the outer circumferential surface of the elastic member 31 and the inner circumferential surface of the bracket 32 are directly in contact with each other. Accordingly, it is possible to reduce costs.

In the present embodiment, the first protrusion part 22 is formed integrally with the housing 21, and the second protrusion part 42 is formed integrally with the elastic cylinder 41.

According to this configuration, it is possible to reduce the number of components and improve an assembly property, for example, compared to a case where a spacer as a separate body is interposed between the housing 21 and the elastic cylinder 41, and a spacer as a separate body is interposed between the elastic cylinder 41 and the support cylinder 65.

In the present embodiment, the first protrusion part 22 is formed integrally with the housing 21, and therefore, it is possible to simplify the elastic member 31 and the bracket 32.

In the present embodiment, the second protrusion part 42 is formed integrally with the elastic cylinder 41, and therefore, when adjusting (tuning) a protrusion amount of the second protrusion part 42, there is little impact from a surrounding member, for example, compared to a case where the protrusion part is formed on the housing 21 or the bracket 32. Thereby, it is possible to further simplify the manufacturing management, and it is possible to reduce costs.

According to the configuration of the present embodiment, the first protrusion part 22 is accommodated in the first regulation part 44.

According to this configuration, it is possible to regulate the movement in the circumferential direction of the EWP 10 with respect to the elastic member 31 and prevent the position displacement between the first protrusion part 22 and the second protrusion part 42. As a result, it is possible to stably support the EWP 10 for a long period of time.

Further, in a state where the positions of the first protrusion part 22 and the first regulation part 44 are adjusted, the EWP 10 and the elastic member 31 are assembled, and thereby, it is possible to arrange the first protrusion part 22 at a desired position. Therefore, it is possible to improve the assembly property between the EWP 10 and the elastic member 31.

According to the configuration of the present embodiment, the second protrusion part 42 is accommodated in the second regulation part 69.

According to this configuration, it is possible to regulate the movement in the circumferential direction of the second protrusion part 42 with respect to the bracket 32 and prevent the position displacement between the first protrusion part 22 and the second protrusion part 42. As a result, it is possible to stably support the EWP 10 for a long period of time.

Further, in a state where the positions of the second protrusion part 42 and the second regulation part 69 are adjusted, the elastic member 31 and the bracket 32 are assembled, and thereby, it is possible to arrange the second protrusion part 42 at a desired position. Therefore, it is possible to improve the assembly property between the bracket 32 and the elastic member 31.

In the configuration of the present embodiment, the support cylinder 65 surrounds the elastic cylinder 41 by the first arc section 55 and the second arc section 61.

According to this configuration, the support cylinder 65 has a divided configuration of the first arc section 55 and the second arc section 61. Thereby, for example, in a case where the same EWP 10 is mounted on different types of vehicles or the like, the second support part 52 having the stay 63 is appropriately changed depending on the type of vehicle, and it is possible to use the first support part 51 regardless of the type of vehicle. That is, it is possible to commonalize the first support part 51 among types of vehicles, and therefore, it is possible to reduce costs.

The above embodiment is described using a configuration in which the width in the circumferential direction of the first protrusion part 22 and the second protrusion part 42 is gradually decreased toward the outside in the radial direction; however, the embodiment is not limited only to this configuration. The shape of the first protrusion part 22 and the second protrusion part 42 can be appropriately changed.

First Modified Example

Next, a modified example of the above embodiment is described.

Figure 2:
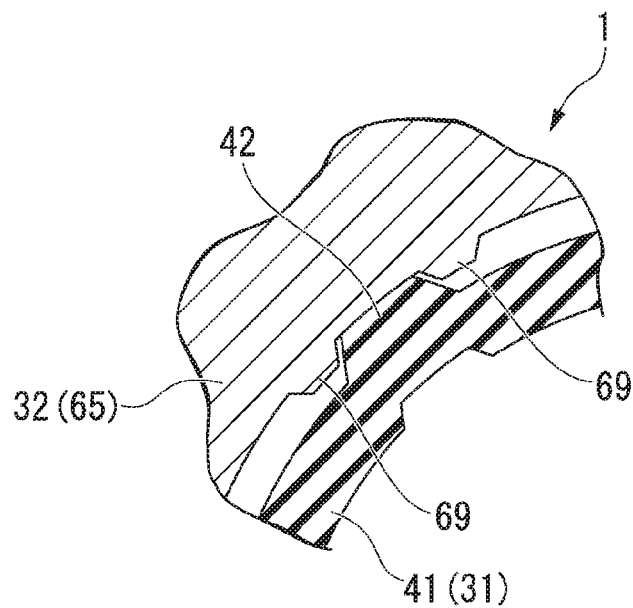
FIG. 2 is an enlarged cross-sectional view of a pump unit according to a first modified example.

The above embodiment is described using a configuration that is recessed outward in the radial direction from the inner circumferential surfaces of the support cylinder 65 and the elastic cylinder 41 as the regulation part; however, the embodiment is not limited only to this configuration. For example, the second regulation part 69 may protrude inward in the radial direction from portions of the inner circumferential surface of the support cylinder 65 each of which is located at each of both sides in the circumferential direction with respect to the second protrusion part 42 like the bracket 32 shown in FIG. 2.

Second Modified Example

The above embodiment is described using an example in which the first protrusion part 22 is formed on the housing 21, and the second protrusion part 42 is formed on the elastic cylinder 41; however, the embodiment is not limited only to this configuration.

Figure 3:
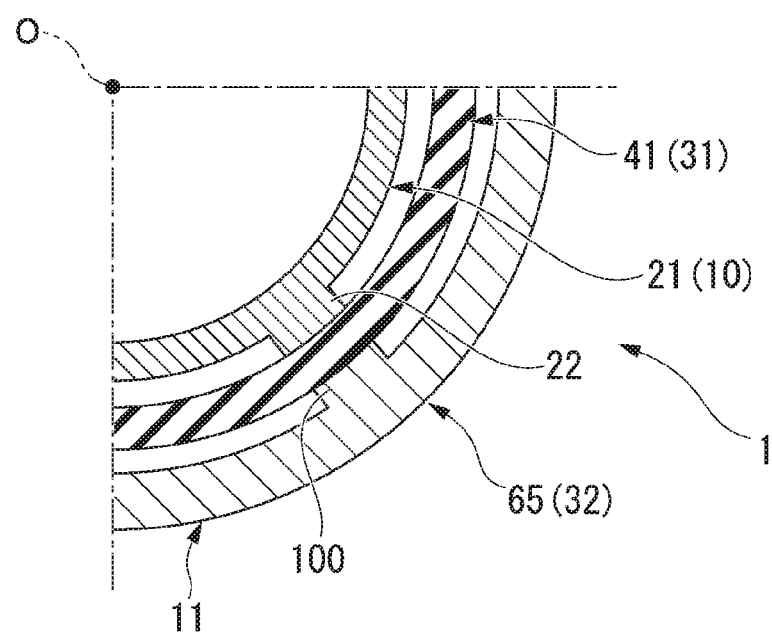
FIG. 3 is an enlarged cross-sectional view of a pump unit according to a second modified example.

For example, as shown in FIG. 3, a second protrusion part 100 (second spacer) that is interposed between the support cylinder 65 and the elastic cylinder 41 may be formed on an inner circumferential surface of the support cylinder 65. In this case, the first regulation part and the second regulation part may be provided on the elastic cylinder 41. The second protrusion part 100 is formed integrally with the support cylinder 65, and thereby, it is possible to simplify the elastic cylinder 41.

Figure 4:
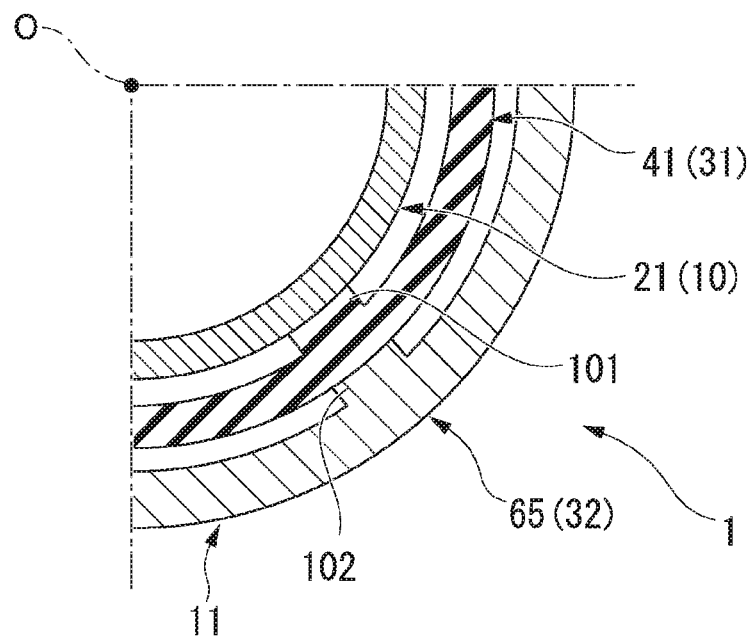
FIG. 4 is an enlarged cross-sectional view of the pump unit according to the second modified example.

As shown in FIG. 4, a first protrusion part 101 (first spacer) that is interposed between the elastic cylinder 41 and the housing 21 may be formed on an inner circumferential surface of the elastic cylinder 41, and a second protrusion part 102 (second spacer) that is interposed between the support cylinder 65 and the elastic cylinder 41 may be formed on an inner circumferential surface of the support cylinder 65. In this case, the first regulation part may be provided on the housing 21, and the second regulation part may be provided on the elastic cylinder 41.

Figure 5:
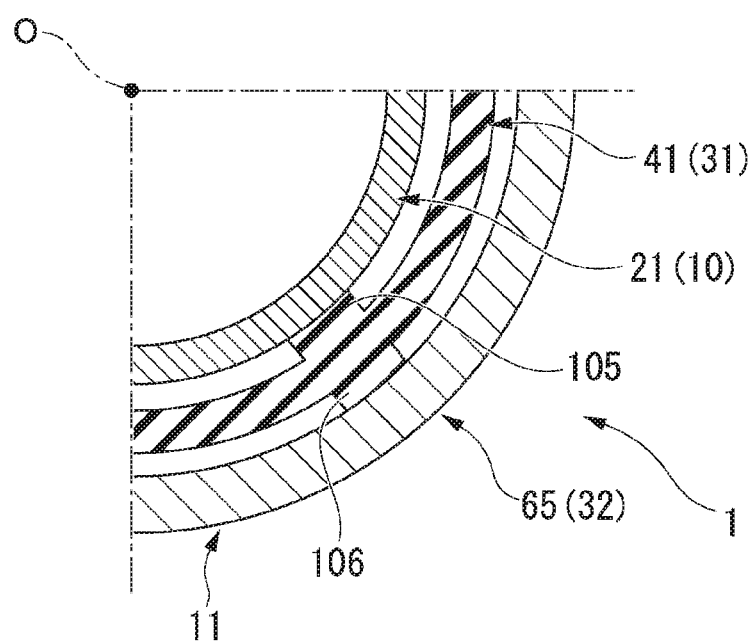
FIG. 5 is an enlarged cross-sectional view of the pump unit according to the second modified example.

As shown in FIG. 5, a first protrusion part 105 (first spacer) that is interposed between the elastic cylinder 41 and the housing 21 may be formed on an inner circumferential surface of the elastic cylinder 41, and a second protrusion part 106 (second spacer) that is interposed between the support cylinder 65 and the elastic cylinder 41 may be formed on an outer circumferential surface of the elastic cylinder 41. In this case, the first regulation part may be provided on the housing 21, and the second regulation part may be provided on the support cylinder 65.

Figure 6:
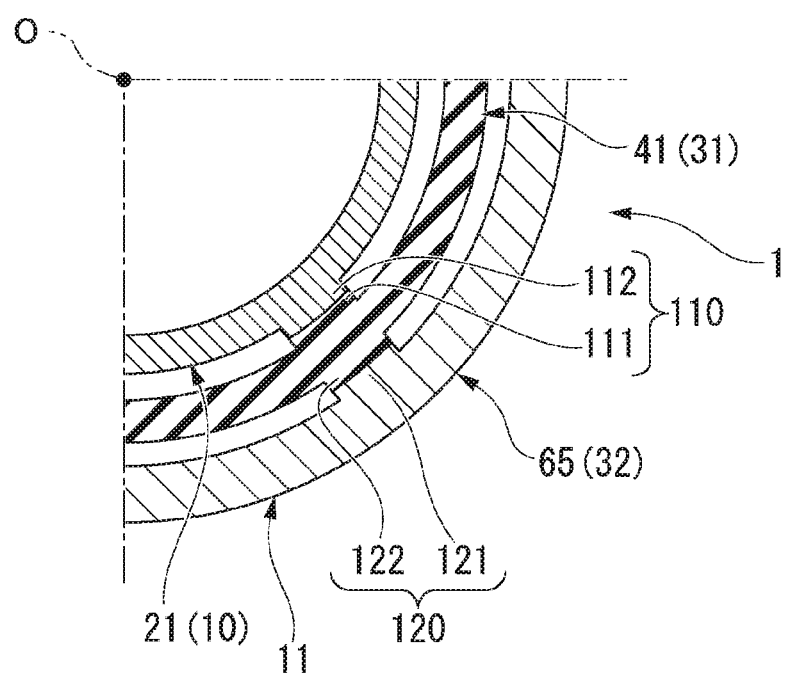
FIG. 6 is an enlarged cross-sectional view of the pump unit according to the second modified example.

As shown in FIG. 6, a first protrusion part 110 (first spacer) may include an inner protrusion part 111 that protrudes inward in the radial direction from the elastic cylinder 41 and an outer protrusion part 112 that protrudes outward in the radial direction from the housing 21 and that is butted to the inner protrusion part 111.

Further, a second protrusion part 120 (second spacer) may include an inner protrusion part 121 that protrudes inward in the radial direction from the support cylinder 65 and an outer protrusion part 122 that protrudes outward in the radial direction from the elastic cylinder 41 and that is butted to the inner protrusion part 121. The combination of the protrusion parts can be appropriately changed.

The above embodiment is described using a configuration in which the first protrusion part is formed integrally with at least one of the elastic cylinder 41 and the housing 21; however, the embodiment is not limited only to this configuration. A first spacer as a separate body may be interposed between the elastic cylinder 41 and the housing 21.

The above embodiment is described using a configuration in which the second protrusion part is formed integrally with at least one of the support cylinder 65 and the elastic cylinder 41; however, the embodiment is not limited only to this configuration. A second spacer as a separate body may be interposed between the support cylinder 65 and the elastic cylinder 41.

When the spacer as a separate body is used, a regulation part may be provided on at least one of members (for example, in the case of the second spacer, the support cylinder 65 and the elastic cylinder 41) each of which is located at each of both sides in the radial direction with respect to the spacer.

Other Modified Examples

Although the preferred embodiment of the invention has been described, the invention is not limited to the embodiment. Addition, omission, and substitution of the configuration, and other changes can be made without departing from the scope of the invention. The invention is not limited by the above description, but is limited only by the appended claims.

For example, the above embodiment is described using an example of the EWP 10 as the vibration body and the like; however, the embodiment is not limited only to this configuration. The vibration body may be a rotation body including a motor, a pipe through which a liquid flows, and the like in addition to the EWP 10.

The above embodiment is described using a configuration in which the vibration body unit is mounted on the vehicle; however, the embodiment is not limited only to this configuration.

The above embodiment is described using a configuration in which four first protrusion parts are arranged to be spaced in the circumferential direction, and four second protrusion parts are arranged to be spaced in the circumferential direction; however, the number of the first protrusion parts and the second protrusion parts can be appropriately changed. In this regard, the numbers of each of the first protrusion parts and the second protrusion parts can be preferably three or more.

The above embodiment is described using an example in which all of the EWP 10, the elastic member 31, and the bracket 32 are formed in a cylindrical shape; however, the embodiment is not limited only to this configuration. The EWP 10, the elastic member 31, and the bracket 32 may be formed in an angled tube shape and the like. Further, the EWP 10, the elastic member 31, and the bracket 32 may not be arranged on the same axis.

The above embodiment is described using a configuration having both the first regulation part and the second regulation part; however, the embodiment is not limited only to this configuration. The configuration may have any one of the regulation parts or may have no regulation part.

The configuration element in the embodiment described above can be appropriately replaced by a known configuration element without departing from the scope of the invention. Further, the modified examples described above may be appropriately combined.

What is claimed is:

1. A vibration body unit, comprising:
a vibration body;
an inner cylinder that surrounds a circumference of the vibration body and that is elastically deformable;
an outer cylinder that surrounds a circumference of the inner cylinder and that has an attachment section which is attached to a base part;
a plurality of first spacers that are interposed between the vibration body and the inner cylinder and that are arranged to be spaced in a circumferential direction; and
a plurality of second spacers that are interposed between the inner cylinder and the outer cylinder and that are arranged to be spaced in a circumferential direction,
wherein the plurality of first spacers and the plurality of second spacers are arranged such that at least part of each of the plurality of first spacers faces each of the plurality of second spacers in a radial direction across the inner cylinder,
the plurality of first spacers are formed integrally with the vibration body,
the vibration body is supported by the inner cylinder via the plurality of first spacers, and
the inner cylinder is supported by the outer cylinder via the plurality of second spacers.

2. The vibration body unit according to claim 1, wherein the second spacer is formed integrally with at least one of the inner cylinder and the outer cylinder.

3. The vibration body unit according to claim 1, wherein the first spacer is formed integrally with the inner cylinder.

4. The vibration body unit according to claim 1, wherein the second spacer is formed integrally with the inner cylinder.

5. The vibration body unit according to claim 1, wherein the second spacer is formed integrally with the outer cylinder.

6. The vibration body unit according to claim 1, wherein a first regulation part that regulates a movement in a circumferential direction of the first spacer with respect to the inner cylinder is formed on the inner cylinder.

7. The vibration body unit according to claim 1, wherein a second regulation part that regulates a movement in a circumferential direction of the second spacer with respect to one or more of the inner cylinder and the outer cylinder is formed on the one or more of the inner cylinder and the outer cylinder.

8. The vibration body unit according to claim 1, wherein the outer cylinder comprises:
a first support part that has the attachment section; and
a second support part that is connected to the first support part and that surrounds a circumference of the inner cylinder together with the first support part.

9. A vibration body support structure, comprising:
an inner cylinder that surrounds a circumference of a vibration body and that is elastically deformable;
an outer cylinder that surrounds a circumference of the inner cylinder and that has an attachment section which is attached to a base part;
a plurality of first spacers that are interposed between the vibration body and the inner cylinder and that are arranged to be spaced in a circumferential direction; and
a plurality of second spacers that are interposed between the inner cylinder and the outer cylinder and that are arranged to be spaced in a circumferential direction,
wherein the plurality of first spacers and the plurality of second spacers are arranged such that at least part of each of the plurality of first spacers faces each of the plurality of second spacers in a radial direction across the inner cylinder,
the plurality of first spacers are formed integrally with the vibration body,
the vibration body is supported by the inner cylinder via the plurality of first spacers, and
the inner cylinder is supported by the outer cylinder via the plurality of second spacers.

* * * * *